(12) United States Patent
Owens et al.

(10) Patent No.: US 8,079,245 B1
(45) Date of Patent: Dec. 20, 2011

(54) FUEL OIL AND PROPANE MONITORING, DELIVERY AND SALE SYSTEM AND METHOD

(75) Inventors: Steven C. Owens, Needham, MA (US); Richard H. Gibbs, Swampscott, MA (US); Peter B. Hunt, Concord, MA (US)

(73) Assignee: EnerTrac, Inc., Hudson, NH (US)

( * ) Notice: Subject to any disclaimer, the term of this patent is extended or adjusted under 35 U.S.C. 154(b) by 678 days.

(21) Appl. No.: 12/038,895

(22) Filed: Feb. 28, 2008

Related U.S. Application Data

(63) Continuation-in-part of application No. 11/625,048, filed on Jan. 19, 2007.

(51) Int. Cl.
  G01F 19/00 (2006.01)
  G01F 25/00 (2006.01)
(52) U.S. Cl. ........................................ 73/1.73
(58) Field of Classification Search ............. 73/1.73, 73/1.74
  See application file for complete search history.

(56) References Cited

U.S. PATENT DOCUMENTS

| | | | |
|---|---|---|---|
| 2,375,084 A | 5/1945 | Coroniti | |
| 2,932,315 A | 4/1960 | Jarzembski | |
| 3,696,675 A | 10/1972 | Gilmour | |
| 4,056,978 A | 11/1977 | Zimmermann | |
| 4,147,893 A | 4/1979 | Matson | |
| 4,406,152 A * | 9/1983 | Palmer et al. | 73/1.73 |
| 4,449,405 A | 5/1984 | Franz et al. | |
| 4,524,617 A | 6/1985 | Krehel et al. | |
| 4,831,866 A | 5/1989 | Forkert et al. | |
| 4,845,486 A | 7/1989 | Knight et al. | |
| 5,062,277 A | 11/1991 | Heitmann et al. | |
| 5,665,895 A | 9/1997 | Hart et al. | |
| 5,708,424 A | 1/1998 | Orlando et al. | |
| 5,827,943 A * | 10/1998 | Schmidt | 73/1.73 |
| 6,253,610 B1 | 7/2001 | Struzik et al. | |
| 6,336,362 B1 | 1/2002 | Duenas | |
| 6,345,214 B1 | 2/2002 | Dulphy-Vigor et al. | |
| 6,597,998 B1 * | 7/2003 | Gonring | 702/55 |
| 6,700,503 B2 | 3/2004 | Masar et al. | |
| 6,711,949 B1 | 3/2004 | Sorenson | |
| 7,079,037 B2 * | 7/2006 | Ross, Jr. et al. | 340/618 |
| 2003/0183001 A1 | 10/2003 | Zimmermann et al. | |
| 2005/0056090 A1 | 3/2005 | McSheffrey et al. | |
| 2006/0043882 A1 | 3/2006 | Shi et al. | |

FOREIGN PATENT DOCUMENTS

GB 2245781 A 6/1990
* cited by examiner

*Primary Examiner* — Hezron Williams
*Assistant Examiner* — Rose M Miller

(57) ABSTRACT

A residential fuel measurement system for optimizing the fuel delivery including a sensor and transmission system with methods of use. The sensor includes a photo sensitive sensor for measuring the position of the existing fuel tank indicator. A transmission system transmits the position to central receiving station. Receiving station receives information, and other related information from third party sources and calculates a plurality of reports including fuel delivery routing, calibration, alarms and billing information.

20 Claims, 6 Drawing Sheets

FUEL OIL AND PROPANE MONITORING, DELIVERY AND SALE SYSTEM AND METHOD

RELATED APPLICATIONS

This application is a Continuation-in-Part of U.S. application Ser. No. 11/625,048 filed on Jan. 19, 2007. The entire teachings of the above application are incorporated herein by this reference.

BACKGROUND OF THE INVENTION

Residential fuel oil and propane distribution requires the delivery of fuel from a distribution center, typically operated by a local fuel delivery company, to each residence. On average, seven trips are made per customer per year.

There are costs to the fuel company for each trip, including the fuel truck driver's salary and costs of maintaining the truck. Yet, while the average oil tank size is 275 gallons in the United States, the average delivery is less than 125 gallons. Propane delivery efficiency, with the common 1000 gallon tanks, is even less than heating oil. Thus, many more trips are being made per year than necessary, impacting the profitability of the oil and propane delivery companies and consequently the costs of the fuel to the consumer.

Despite the fact that the average delivery is made when the tank is more than one half full, "run outs" are also common. When a run out occurs, the customer's home is usually no longer heated. In the best case, a special trip is necessary to deliver new fuel and re-light the furnace. Often, lines need to be purged and pilot lights re-lit in the event of a run out. This adds additional cost to the fuel delivery company that may not be recoverable from the customer. Moreover, if the customer is not at home during the run out, the home's water pipes can freeze and burst—causing avoidable repairs.

Many systems have been devised to solve these problems. The most prevalent of the present solutions is the "Degree Day" system. This is a system that measures the outside temperatures and past usage to predict when the next delivery should be made. This system, however, has drawbacks: it assumes that past usage patterns will continue; and new customers cannot be served because there are no past usage data. The system also assumes a number for the rate of usage related to average daily temperatures, and the system cannot function properly with any data entry error. At best, the Degree Day system is an approximation of the customer's fuel needs.

Other systems have been devised to directly measure the tank volume and then use this information in the scheduling of fuel delivery. Various level sensors have been proposed such as float systems or ultrasonic devices. The homeowner may then monitor the sensor and call the delivery company when the fuel level is low. Other systems propose to automatically communicate tank level information to the fuel delivery company such as via the cellular telephone network.

SUMMARY OF THE INVENTION

A need exists for a system that can provide accurate information to the delivery company on a daily basis, or as required, improving the scheduling of the fuel delivery. This information will allow the delivery company to more efficiently deliver fuel on a "just in time" basis. Such a system will prevent "run outs", providing a greater level of comfort to the homeowner that the house is safe from bursting pipes. In addition, such a system can provide the added benefit of measuring the temperature of the home and reporting it to the delivery company. Thus, if the heating system were to fail for any reason, a technician can be sent out to fix the problem before pipes freeze, even if no one is at home to detect the malfunction.

The present invention concerns a low cost approach to installing a fuel tank sensor that provides accurate daily information to the delivery company. In addition, it provides information related to the temperature inside the home in some embodiments.

In one implementation, the fuel monitoring and delivery system comprises three sub systems or units: a sensor/transmitter unit, a receiver unit, and central control unit for the delivery company. The sensor/transmitter unit includes a transmitter with a sensor that is fitted to the existing gage/indicator on the tank. The sensor measures the position of the existing indicator on the fuel oil or propane tank.

In the preferred embodiment, a sensor/transmitter unit includes a battery and timer. Also, the sensor/transmitter is preferably mounted to the tank over the top of the existing indicator. The timer turns-on the sensor/transmitter unit once per day, in one example. When the sensor/transmitter unit turns-on, a reading is taken and the results are transmitted by radio signal to the receiver unit. This timer reduces the power requirements such that a single battery can be made to last many years without the need for costly replacement, or the need to run electrical power to the sensor, which would otherwise create compliance issues.

The receiver unit is preferably powered continuously and is normally powered by 110 VAC wall power. The signal from the sensor/transmitter unit is received and stored by the receiver unit. In the preferred embodiment the receiver unit is connected to a data network such as the internet, although in other embodiments it is connected to a phone line or other communications medium. The receiver also preferably contains a temperature sensor for measuring the temperature inside the house.

The central control unit retrieves the tank level and temperature data through the internet (or other media). These data are matched with the account in a database, which contains account information (name, address, etc), information related to calibration (number of gallons delivered and the date of delivery), as well as history of usage (history of tank level data). The controller then uses this information to calibrate the sensor and schedule deliveries.

A unique advantage of the invention is its ability to provide more accurate information than the existing indicator. As a system, calibration is generally performed each time the tank is filled. The system is notified as to how many gallons the tank holds, typically when the sensor is first installed. Further, there is a sensor reading just before the fill. In addition, the number of gallons that are delivered is also input into the system. With this information, a new calibration is performed with each fill, thus eliminating any long-term drift of the sensor or the indicator. Since the system is calibrated each time the tank is filled, the system does not rely on the existing indicator's calibration, but rather the fill information.

Each day, the central control unit collects sensor data from all sensors. Any temperature reading below a threshold produces an alarm condition and an email is sent to a service technician. The central control unit can use the sensor information to calculate an effective route for each delivery truck. The next day the process is repeated.

In one embodiment, a separate threshold temperature is stored for each customer. In this way, the temperature is allowed to range over a lower temperature for a customer with at a vacation home, for example, since, in such homes during the winter, low temperature settings are used to conserve fuel to heat the otherwise vacant house. In contrast, at a commercial establishment, a higher threshold temperature is set so that much smaller swings in temperature will generate an alarm condition.

In some embodiments, the driver uses a personal digital assistant or other internet/cellular phone system accessible device to obtain updated routing information and for entering information about each delivery such as how many gallons were delivered at each house. The driver's mobile device then synchronizes this information with the system database maintained by the central control unit, either through a wired connection, or wirelessly.

In some embodiments, a radio frequency identification (RFID) tag is placed at each home, ideally at the fill point. The RFID is used to identify the specific account. In the preferred embodiment, the driver's mobile device reads the RFID to confirm the correct account and prompt the delivery personnel for additional data and instructions.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
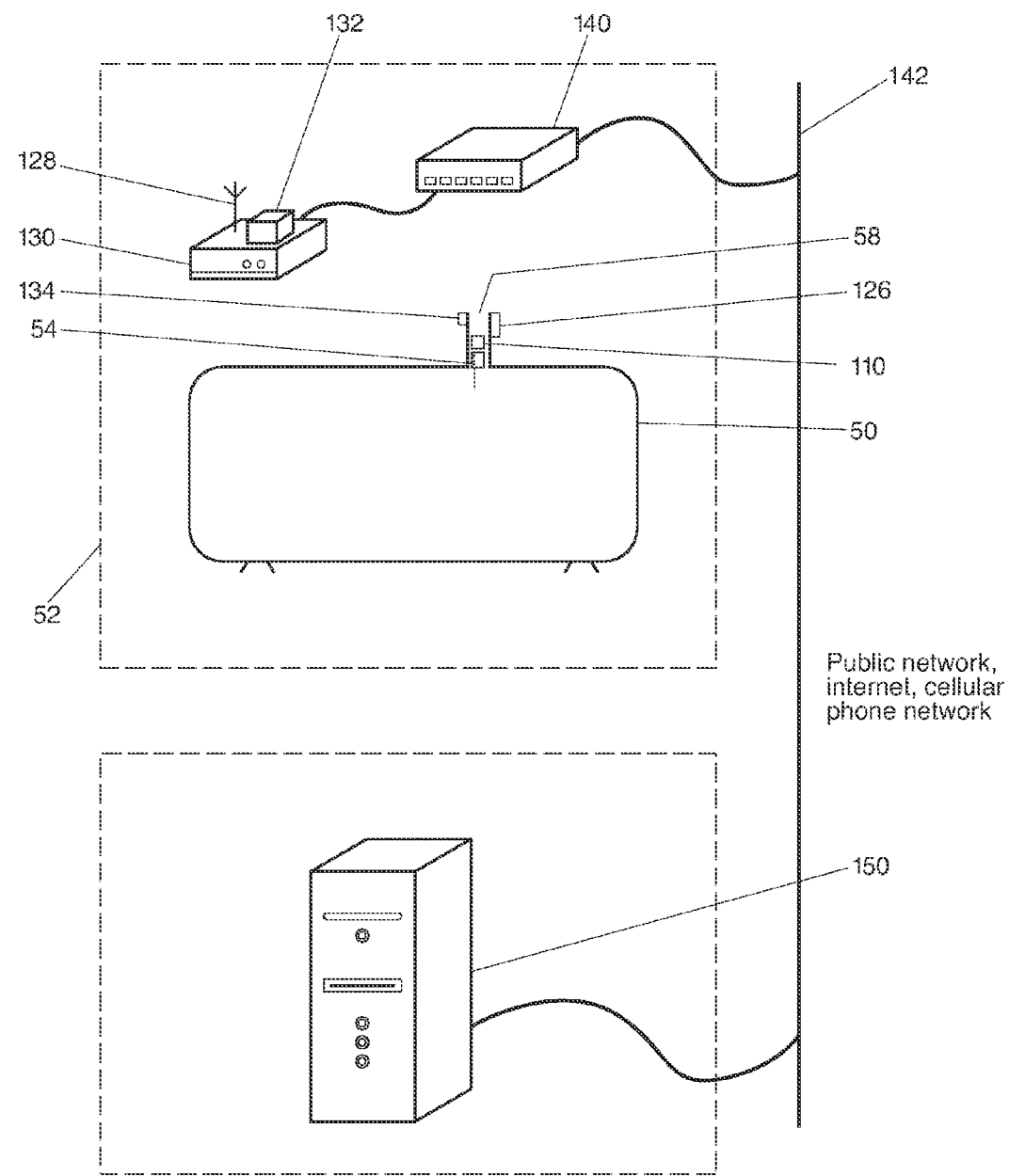
FIG. 1 is a schematic block diagram showing the fuel monitoring and delivery system, illustrating principles of the present invention.

FIG. 1 shows a fuel monitoring and delivery system constructed according to the principles of the present invention.

The tank 50 is normally installed in the basement of the home/building or buried in the ground as is common with propane tanks The tank has an existing fuel level gage 54. This gage gives a visual indication of the amount of fuel in the tank. In some cases this gage is a float gage and in some cases this gage is a pressure gage. Regardless of the type, the indicator has a known (usually linear) response to the amount of fuel and has an indicator contrasted against a background of graduated markings.

In an embodiment of the present invention, the sensor/transmitter unit 110 is integrated with the existing fuel level indicator 54. In the case of a fuel oil float gage mounted to the port on top of a tank, this integration is accomplished by simply lowering the sensor/transmitter over the top of the existing sight gage. In the case of underground propane tank, this integration is accomplished by removing one or more of the existing screws holding down the existing indicator and placing the sensor/transmitter 110 over the top of this existing indicator and replacing the screws. In the typical example, the gage is a circular fuel level indicator.

The sensor/transmitter unit 110 further comprises a light generating source and a pattern of light sensitive traces arranged to be responsive to the existing indicator's position. In one example of circular fuel level indicator, the light sensitive traces are arranged in an arcuate pattern to detect the shadow created by level indicator across the dial of the circular fuel level indicator. In alternate embodiments, the sensor/transmitter comprises a magnetic sensor (such as a Hall sensor) for converting the magnetic position of the existing float gage into an electrical signal.

A receiver unit 130 communicates with the sensor/transmitter unit 110 via antennas 126, 128 at the sensor/transmitter unit 110 and the receiver unit 130. Specifically, the receiver unit 130 receives level information. In one embodiment, the receiver unit 130 also comprises a temperature sensor 132 that monitors ambient temperature. This information is transmitted via a public or private data network 142 to a central control unit 150, which is typically maintained by the fuel delivery company. In one embodiment, the communication path is via a router or modem 140 at the customer's facility/house (premises) 52 that sends the information over the internet 142.

Also, according to one embodiment, an RFID tag 134 is associated with and near the fill location 58. A mobile device of the fuel truck operator is used to scan the RFID tag to enable access of the customer's account and enable direct data access to update the total amount of fuel delivered.

Figure 2:
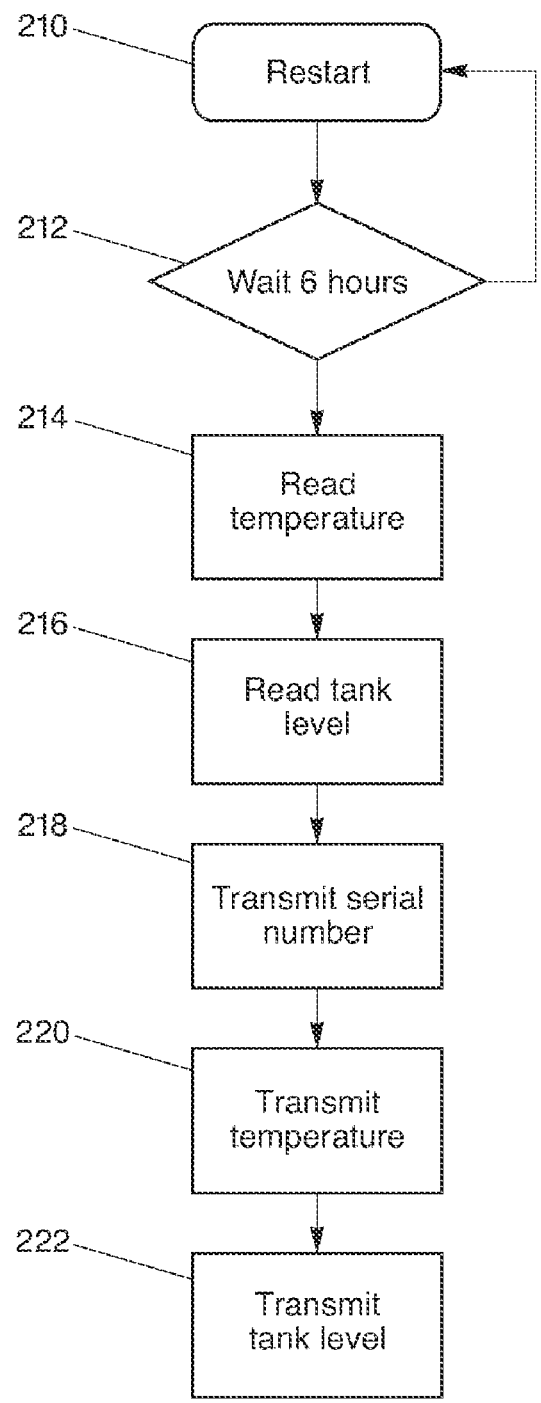
FIG. 2 is a flow diagram illustrating the operation of the sensor/transmitter unit, illustrating principles of the present invention.

FIG. 2 shows the operation of the sensor/transmitter unit 110.

In an embodiment, the sensor/transmitter unit 110 is shipped with a plug 118 (FIG. 3) that is attached to only one pin of a receptacle 120. The plug 118 and receptacle 120 form a switch that removes or applies voltage to the printed circuit board (PCB) 112. When the plug 118 is only connected to one pin (or no pins) on the receptacle 120, current is not allowed to flow to the electronic components on the PCB 112. When the plug 118 is installed on both pins of the receptacle 120 a circuit is formed to allow current to flow to the electronic components on the PCB 112.

After the plug 118 in installed onto the receptacle 120, the sensor/transmitter unit 110 starts executing the software at the restart vector 210 and then the software waits for 6 hours in step 212. At the end of the 6-hour wait, the unit 110 reads the temperature at the tank 50 (step 214) and tank level (step 216). The sensor/transmitter unit 110 then transmits the information to the receiver unit 130. Specifically, sensor/transmitter unit 110 transmits a serial number of the sensor/transmitter unit (step 218), the tank and or outside temperature (step 220), and the tank level (step 222). The temperature sensor on the sensor/transmitter unit 110 enables temperature correction for the level of the propane tank. Since higher temperatures will reduce the volume of liquid that a float sensor will detect but will increase the detected pressure for a pressure based level sensor. The information from the sensor-transmitter temperature sensor is used to correct for this noise source.

In a preferred embodiment, the serial number transmitted is a 64-bit number. Each sensor/transmitter unit 110 has a unique 64-bit serial number. A label (not shown) on the sensor/transmitter 110 contains the digital equivalent of this serial number. After the installer has installed the sensor/transmitter unit 110 onto the tank 50, the installer records this serial number so that it can be entered into a customer database of the central control unit 150, back at the installer's office or fuel delivery company.

Figure 3:
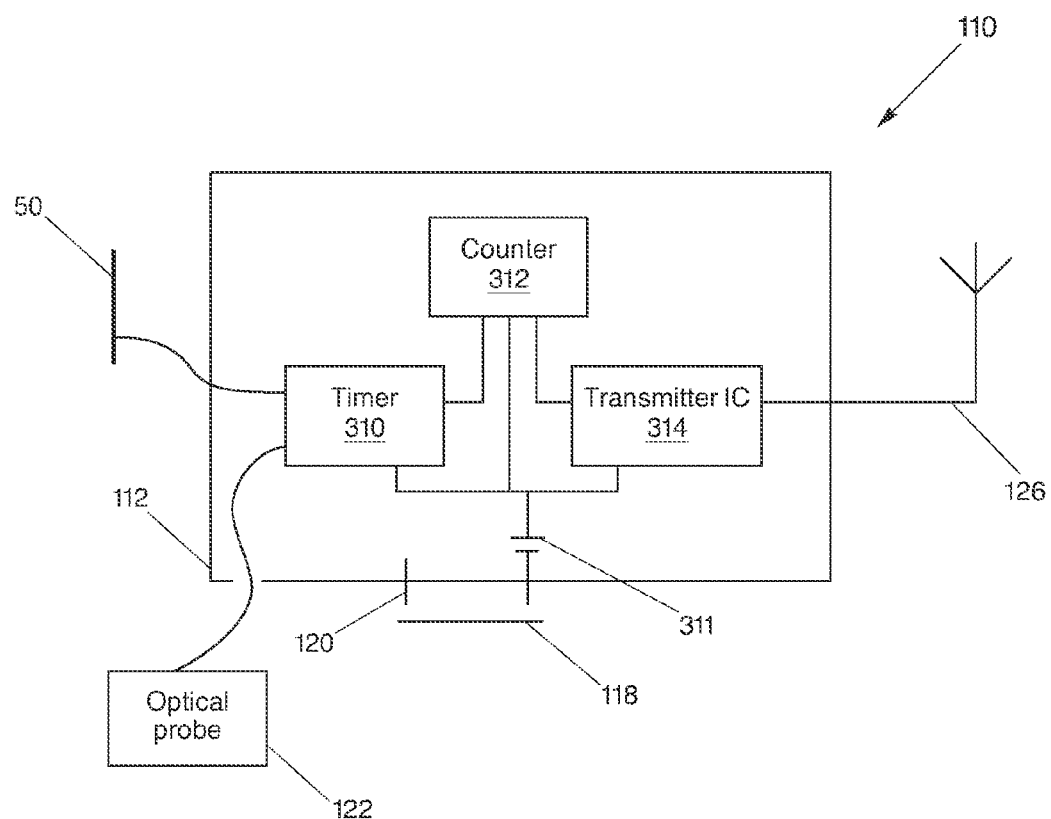
FIG. 3 is a block diagram illustrating the sensor/transmitter unit, illustrating principles of the present invention.

FIG. 3 shows the components of the sensor/transmitter unit 110. An optical probe 122 connects electrically to a timer 310 such as a 555 timer as is well known in the art. The timer 310 is an oscillator in which the frequency is dependent upon the resistance of the optical probe 122. When the tank indicator 54 is pointing to empty, the resistance will be low. When the tank indicator 54 is pointing to full, the resistance will be high.

The oscillations from the timer 310, which is proportional to the tank level indicator's position, are counted by a microcontroller 312 on a printed circuit board (PCB) 116 over a period of time, e.g., one second, and sent to the transmitter IC 314. The transmitter 314 translates the information into a RF signal that is sent to the receiver unit 130 via antenna 126.

The sensor/transmitter unit 110 is powered by a battery 311. As described previously, the plug 118 and receptacle 120 are configured so that the battery does not power the unit 110 until after installation. In an embodiment of the invention, a timing circuit (not shown) periodically activates the unit 110 so that battery power is conserved between activations.

After first installing the sensor/transmitter unit 110, the actual tank level is not known. At this moment, the tank's total volume (275 gal in the case of oil or 1000 gal. in the case of propane, for example) and the oscillation value from the timer 310 are known. There is no way of knowing what the exact relationship is between the timer 310 value and the amount of fuel in tank. However, at some point after the installation, the tank will be filled. After the fill, it is known that the tank 50 has 275 or 1000 gallons, and how many gallons it took to fill the tank. Therefore, it is further known how many gallons were in the tank just before the fill. Since the relationship between the timer 310 value and the tank level will typically be linear, and two points are known, the equation for a line describing the relationship between the timer frequency and the tank level can be derived. The known values are the tank level just before the fill and the timer 310 value just before the fill, and the tank level after the fill, and the timer 310 value just after the fill.

In more detail, since the sensor is reactive to the position of the tank level indicator and the indicator's position has a substantially linear relationship to the amount of fuel in the tank, in the preferred embodiment, the frequency of the timer (310) has a substantially linear relationship to the amount of fuel in the tank. But, even if not linear, the relationship is known. This linear relationship can be represented by the equation: $y=mx+B$, where $y=$ the tank level, $m=$ slope of the line between empty and full, and $B=y$ intercept of the line. The frequency of the timer 310 is known just before the fill, and since the number of gallons delivered and the tank size is also known, one point on this line is known; this point being the point on the line just prior to the fill. Since the tank is full after a fill, and we know the oscillation/frequency value after the fill, we know this point on this line. Since two points of the line are known, the slope and the intercept of the line can be calculated. Further, any non-linearity (largely related to the end effects of the probe) can be calibrated out in a similar manner using regression.

It should be noted that as long as the function of the indicator to level in the tank is known, a regression method will be known to those in the art; thus this relationship does not need to be linear.

Further, preferably, each time the tank is filled, this calibration process is repeated. In this way, any drift of the sensor unit 110 is calibrated out, regardless of the cause of this drift.

Figure 4:
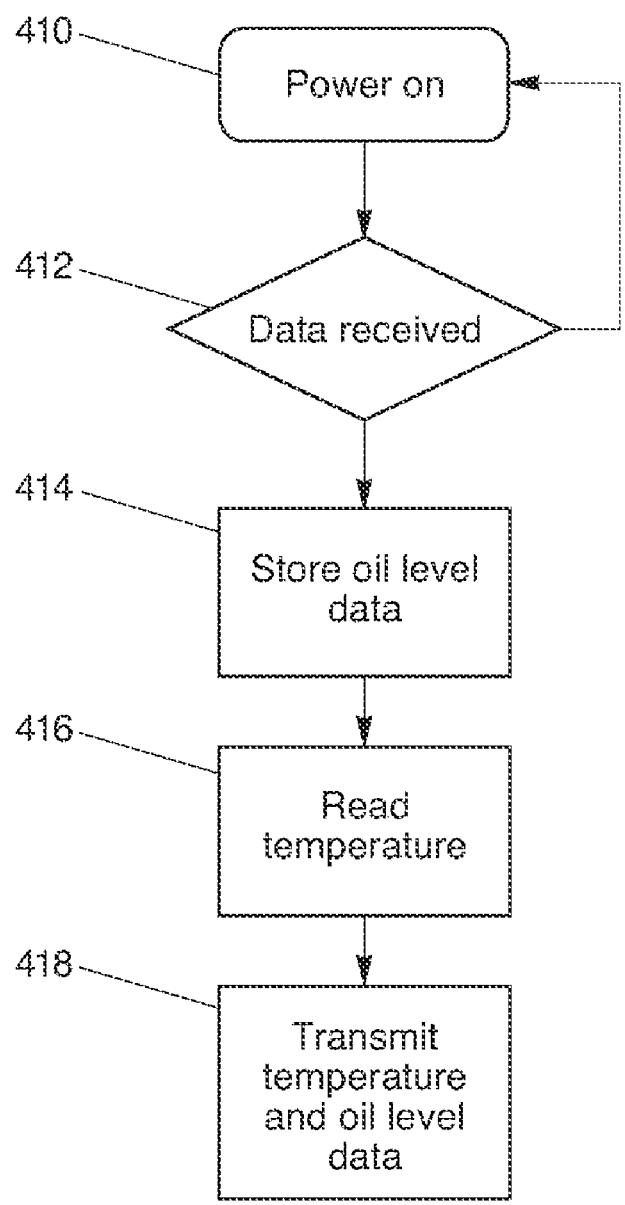
FIG. 4 is a flow diagram illustrating the operation of the receiver unit, illustrating principles of the present invention.

FIG. 4 shows the operation of the receiver unit 130. Upon receiving power, the receiver 130 starts operation at its restart vector 410. The receiver waits in step 412 until data are received from the sensor/transmitter unit 110. When data from the transmitter are received, the tank level data are stored in step 414. Also, the ambient temperature is read from the temperature sensor 132 in step 416. The receiver unit 130 then transmits the received level data and the temperature data over the internet to a specific central control unit 150 that hosts an internet or intranet web page in step 418 along with the serial number of the sensor transmitter unit 110. The data may then be displayed on the web page. The amount of fuel measured in the tank and the ambient temperature (of the residence) may be recorded. An alarm indicator can be activated as a function of temperature.

The central control unit 150 sorts the data according to each customer by matching the received serial number to the serial numbers stored for each customer upon installation. That is, since each sensor/transmitter record that is transmitted to the central control unit is assigned a unique serial number, and each serial number is assigned to a specific customer, and the data can be sorted for each customer. These reports are then sent over the internet to the fuel delivery company. Once the data are at the fuel delivery company, each record is matched with a customer account. The calibration data are also stored within the fuel delivery company's database. Each time data are received by the fuel delivery company's database, a new tank level is calculated and displayed for each customer. Each time a fill is made to a customer, the fuel delivery company database calculates new calibration data for that account. In this way, the tank level of each customer in the database is known in real time and is continually updated.

In the event that the data are not reported from a specific residence, the central control unit 150 resorts back to the "degree day" algorithm. The data displayed are then marked to indicate that it is less accurate than all the other data points—for example being a different color than the data that was generated by actual measurement. If enough real time data were collected before the interruption, and enhanced Degree Day data calculation is used wherein the "K" factor used in the calculation is measured from the previous data collection associated with this specific residence.

The sensor/transmitter unit 110 further comprises a light generating source and a pattern of light sensitive traces arranged to be responsive to the existing indicator's position. In one example of circular fuel level indicator the light sensitive traces are arranged in an arcuate pattern to detect the shadow created by level indicator across the dial of the circular fuel level indicator.

Figure 5:
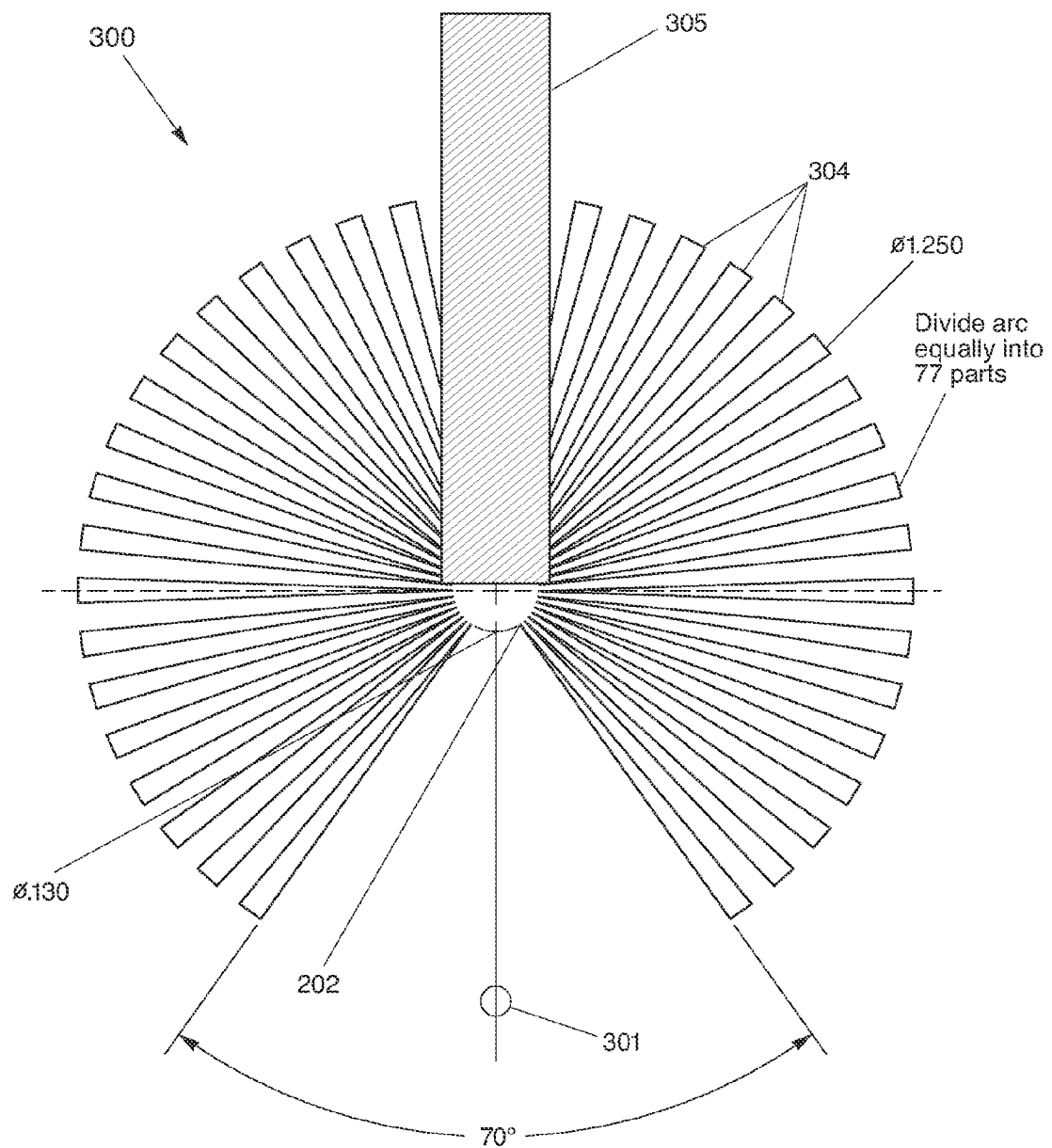
FIG. 5 is a layout for a dial type fuel level indicator photoresistive pattern, illustrating principles of the present invention.

FIG. 5 shows arcuate pattern of light sensitive traces of a photosensitive pattern 300 for the circular fuel level indicator. The pattern is typically constructed of cadmium sulphide or any other material that changes resistance when exposed to light. A light from light source 301 is projected in a way that it either directly, or reflectively, causes a shadow to be cast from the indicator 305 onto the photosensitive pattern 300. The elements 304 of the pattern 300 are electrically connected at intersections 202. This shadow will move across the photosensitive pattern 300 as the indicator 305 changes position due to changes in fuel level of the tank.

Figure 6:
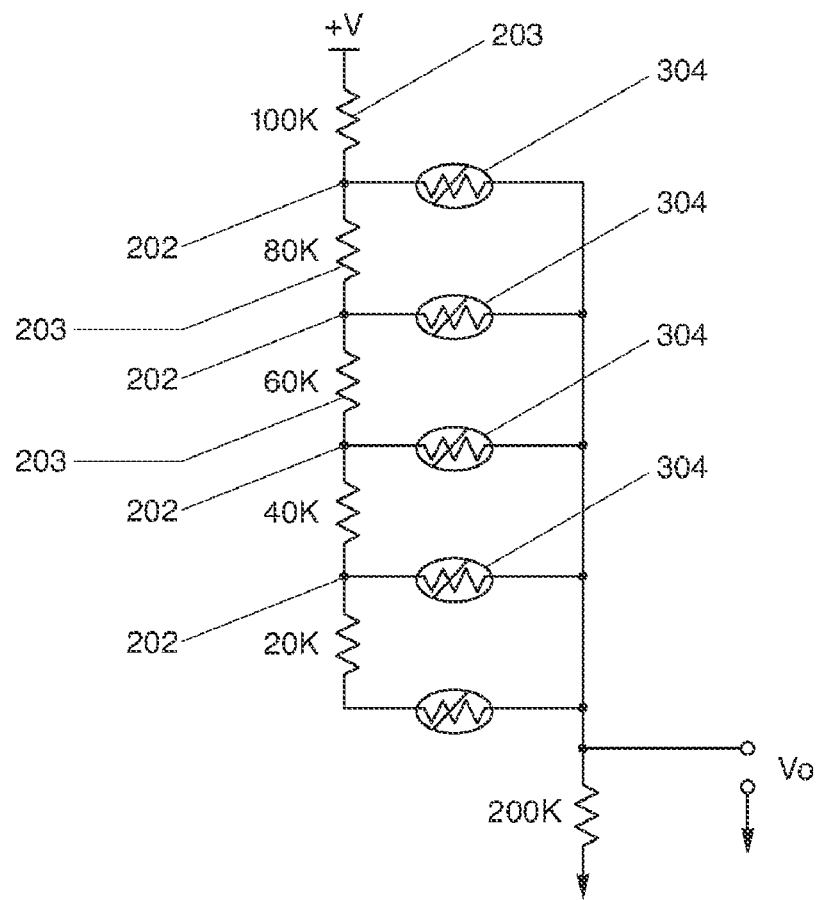
FIG. 6 is a circuit diagram of an embodiment of the inventive sensor system.

FIG. 6 shows the schematic representation of the circuit diagram for photosensitive pattern 300 of the circular fuel level indicator sensor system. Each pattern intersection 202 is connected to a resistor 203. These resistors are arranged in a network such that as the shadow moves down the photosensitive pattern 300, an ever-decreasing voltage is present at the output $V_o$ of the network.

Although the pattern is shown for a circular indicator, other configurations are possible to suit any type of fuel level indicator.

Another embodiment of the invention includes, in addition to a sensor for measuring the amount of fuel in a tank, means for recording and invoicing for the fuel delivered to the tank. An alarm indicator is activated when there is an increase in fuel without a corresponding invoice.

Another embodiment of the invention includes an alarm indictor that is activated as a function of the rate of change in fuel use. For example, in one case, the central control 150 monitors the rate of fuel consumption and then compares this rate to an expected rate of consumption based on a degree-day analysis. High rates of consumption when compared with outside temperatures are used as an indication of efficiency problems with the customer's furnace or a fuel leak. Low rates of consumption are associated possible inoperation or poor operation. In one embodiment, either of these two conditions is used as an alarm condition for triggering a service call.

Yet another embodiment of the invention, in which the system measures the temperature of the premises served by the fuel tank and the atmospheric and/or tank temperature, includes an alarm indicator that is activated by first calculating the fuel use as a function of residence temperature as well as atmospheric temperature and comparing this efficiency with subsequent efficiencies.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for calibrating a tank sensor having an existing fuel level indicator, the method comprising the steps of:
    optically sensing the position of the existing fuel level indicator before a delivery of fuel;
    measuring the position of the existing fuel level indicator after the delivery of fuel; and
    performing a calibration at least partially based on the measurements and an amount of fuel delivered.

2. The method of claim 1, further including determining a fuel level of the tank, before the delivery of fuel, based on the amount of fuel delivered.

3. The method of claim 1, further including determining a fuel level of the tank after performing the calibration.

4. The method of claim 1, further including transmitting calibration data after performing the calibration.

5. The method of claim 1, further including:
    measuring the position of the existing fuel level indicator after removing a portion of fuel from the tank, after the delivery of fuel; and
    determining the fuel level of the tank.

6. A method, comprising:
    receiving a first indication of a position of a fuel level indicator of a tank at a first time, the first indication being a frequency of a timer;
    adding an amount of fuel to the tank;
    receiving a second indication of the position of the fuel level indicator at a second time, after the amount of fuel is added to the tank;
    calibrating the fuel level indicator based on the first indication, the second indication, and the amount;
    receiving a third indication of the position of the fuel level indicator at a third time, after a portion of the fuel is removed from the tank; and
    determining a fuel level of the tank based on the third indication.

7. The method of claim 6, wherein receiving the first indication includes optically sensing the position of the fuel level indicator at the first time.

8. The method of claim 6, wherein a relationship between the first indication and the second indication is linear.

9. The method of claim 6, further including calibrating the fuel level indicator based on an ambient temperature.

10. The method of claim 6, further including transmitting the fuel level of the tank based on the third indication.

11. The method of claim 6, further including installing an optical sensor on the fuel level indicator prior to receiving the first indication.

12. A method, comprising:
    sensing a first position of a fuel level indicator of a tank at a first time;
    producing a first frequency based on the first position;
    adding an amount of fuel to the tank;
    sensing a second position of the fuel level indicator at a second time, after the amount of fuel is added to the tank; and
    calibrating the fuel level indicator based on the first position, the second position, and the amount.

13. The method of claim 12, further comprising producing a second frequency, different from the first frequency, based on the second position.

14. The method of claim 12, wherein calibrating the fuel level indicator includes determining the slope between a first point, based on the first position and a fuel level of the tank at the first time, and a second point, based on the second position and a fuel level of the tank at the second time.

15. The method of claim 12, further including:
    sensing a third position of the fuel level indicator at a third time, after a portion of the fuel is removed from the tank; and
    determining a fuel level of the tank based on the third position.

16. The method of claim 15, further including transmitting the fuel level of the tank based on the third indication.

17. The method of claim 12, further including installing an optical sensor on the fuel level indicator prior to sensing the first position.

18. A method for calibrating a fuel oil monitoring system, including:
    sensing a first frequency indicative of a first data representative of a volume of fuel in a fuel tank, and transmitting the first data to a database;

adding an amount of fuel to the fuel tank, and transmitting second data representative of the amount of fuel to the database;
sensing third data representative of the volume of fuel in the fuel tank after adding the amount, and transmitting the third data to a database;
calculating a relationship based on the first data, the second data, and the third data;
sensing fourth data representative of a volume of fuel in the fuel tank after calculating the relationship, and transmitting the fourth data to the database; and
determining the volume of fuel in the fuel tank after calculating based on the relationship and the fourth data.

19. The method of claim 18, wherein the system includes a degree day calculator, the degree day calculator configured to calculate a predicted volume of fuel in the fuel tank.

20. The method of claim 18, further including:
calculating a predicted volume of fuel in the fuel tank;
comparing the predicted volume with the determined volume; and
producing an alarm when the difference between the predicted volume and the determined volume is greater than a predetermined amount.

* * * * *